US007703986B2

(12) United States Patent
Naito

(10) Patent No.: US 7,703,986 B2
(45) Date of Patent: Apr. 27, 2010

(54) SYNTHETIC RESIN RETAINER AND BALL BEARING USING SUCH SYNTHETIC RESIN RETAINER

(75) Inventor: Kenichiro Naito, Kuwana (JP)

(73) Assignee: NTN Corporation, Osaka (JP)

(*) Notice: Subject to any disclaimer, the term of this patent is extended or adjusted under 35 U.S.C. 154(b) by 634 days.

(21) Appl. No.: 11/597,719

(22) PCT Filed: Jun. 3, 2005

(86) PCT No.: PCT/JP2005/010229

§ 371 (c)(1), (2), (4) Date: Feb. 15, 2007

(87) PCT Pub. No.: WO2005/119073

PCT Pub. Date: Dec. 15, 2005

(65) Prior Publication Data

US 2007/0230849 A1 Oct. 4, 2007

(30) Foreign Application Priority Data

Jun. 3, 2004 (JP) ............................ 2004-165750
May 31, 2005 (JP) ............................ 2005-159251

(51) Int. Cl.
*F16C 33/44* (2006.01)

(52) U.S. Cl. ...................................................... 384/526

(58) Field of Classification Search ................. 384/523, 384/527, 528, 530, 539; 403/329, 344; 24/21, 24/DIG. 38, DIG. 41, DIG. 43, DIG. 47, 24/DIG. 48, DIG. 51

See application file for complete search history.

(56) References Cited

U.S. PATENT DOCUMENTS 3,396,977 A * 8/1968 Iguchi ........................ 277/353
3,586,405 A * 6/1971 Claesson .................... 384/526
6,332,717 B1 * 12/2001 Oohira et al. ............... 384/470
2002/0061151 A1 * 5/2002 Hamamoto et al. ......... 384/527

FOREIGN PATENT DOCUMENTS

| | | |
|---|---|---|
| JP | 58-94920 | 6/1983 |
| JP | 61-82126 | 5/1986 |
| JP | 2003-343571 | 12/2003 |
| JP | 2004-036686 | 2/2004 |
| JP | 2004-076778 | 3/2004 |
| JP | 2004-076928 | 3/2004 |

* cited by examiner

*Primary Examiner*—Thomas R Hannon
*Assistant Examiner*—Phillip Johnson
(74) *Attorney, Agent, or Firm*—Wenderoth, Lind & Ponack, L.L.P.

(57) ABSTRACT

In a synthetic resin retainer formed by joining together two annular members by engaging claws of each annular member in engaging holes of the annular member, each of the two annular members 1 has a plurality of hemispherical pockets 4 formed in a side surface thereof to be brought into abutment with the side surface of the other annular member at circumferentially equal intervals. Joint portions are provided between the adjacent pockets 4, and each is provided with an engaging hole 5 and an engaging claw 6. The engaging claws 6 and engaging holes 5 are configured such that gaps are present between the engaging claws 6 and the engaging holes 5 in the initial stage of assembly of the retainer, and the gaps decrease to zero or less upon completion of the assembly of the retainer, thereby preventing wear of the engaging portions of the engaging claws for joining the annular members together.

20 Claims, 9 Drawing Sheets

SYNTHETIC RESIN RETAINER AND BALL BEARING USING SUCH SYNTHETIC RESIN RETAINER

BACKGROUND OF THE INVENTION

1. Technical Field

This invention relates to a synthetic resin retainer mounted mainly in ball bearings that are rotated at high speed, and a ball bearing in which such a synthetic retainer is used.

2. Background Art

JP patent publication 2003-343571A discloses a synthetic resin retainer for use in a ball bearing that is rotated at high speed.

The synthetic resin retainer disclosed in JP patent publication 2003-343571A comprises two annular members made of synthetic resin and each having a plurality of hemispherical pockets formed in one side thereof so as to partially receive balls therein, and joint portions each provided between adjacent pockets. Each joint portion is formed with an engaging hole and an engaging claw configured to be engaged in the corresponding engaging hole formed in the other annular member to join the annular members together.

Since the two annular members forming such a conventional retainer are formed of synthetic resin, it is difficult to provide an end product having intended dimensions due to shrinkage and deformation after forming. In view of this difficulty and for easy assembly of the retainer, conventional retainers of this type have their engaging claws designed such that they have a width in the diametrical direction of the retainers that is smaller than the width of the engaging holes in the diametrical direction of the retainers.

Thus, when the two annular members are joined together into a retainer by engaging the engaging claws in the engaging holes, gaps form between the engaging claws and the engaging holes in the diametrical direction of the retainer. With such a retainer mounted in a bearing, when the ball bearing rotates, the plurality balls rotate alternately faster and slower than the retainer, thus applying loads to the retainer. This causes elastic deformation of the annular members by amounts corresponding to the gaps between the engaging claws and the engaging holes in the diametrical direction of the retainer, which results in sliding movement between the engaging holes and engaging claws. Thus, the engaging portions of the engaging claws tend to become worn, which in turn causes the following problems.

Due to wear of the portions of the engaging claws that are in engagement with the engaging holes, the annular members loosen, thus increasing the width of the retainer as well as the diameter of the pockets. This in turn increases the axial and diametrical movements of the retainer. As a result, the annular members forming the retainer become more likely to interfere with, i.e. come into frictional contact with, other parts of the bearing, such as the outer ring, inner ring and bearing seals, thus increasing the bearing temperature due to heat buildup resulting from frictional contact. This leads to deterioration of the lubricating grease in the bearing. Also, wear powder produced from such frictional contact portions tends to get into contact portions between the balls and the raceways of the inner and outer ring. This could shorten the lifespan of the bearing or cause the bearing to produce noise.

SUMMARY OF THE INVENTION

An object of the present invention is to provide a synthetic resin retainer which is free of the wear between the engaging claws and the engaging holes and thus free of such problems as shortening of the lifespan of the bearing due to wear.

In order to achieve the object, according to the present invention, there is provided a synthetic resin retainer comprising two annular members made of a synthetic resin, each of the annular members having a plurality of hemispherical pockets formed in a side surface thereof to be brought into abutment with the side surface of the other annular member, the hemispherical pockets being arranged at equal intervals in a circumferential direction of the annular member, each of the annular members further including joint portions each disposed between adjacent ones of the hemispherical pockets, each of the joint portions having an engaging hole and an engaging claw, the engaging claws of each of the annular members being configured to be engaged in the respective engaging holes formed in the other of the annular members, thereby joining the annular members together, characterized in that the engaging claws and engaging holes are configured so as to satisfy a relation such that a gap is present between each engaging claw and the engaging hole into which each engaging claw is inserted in a diametrical direction of the retainer in the initial stage of assembly of the retainer, and the gap decreases to zero or less upon completion of assembly of the retainer.

To satisfy such a relation, one of the following configurations (I) to (III) may be employed.

(I) The engaging claws have a width in the diametrical direction of the retainer that is not less than the width of the engaging holes in the diametrical direction of the retainer, and have tapered surfaces on both sides thereof in the diametrical direction of the retainer which reduce the area of the free end surface of each of the engaging claws.

(II) The engaging claws have a width in the diametrical direction of the retainer that is not less than the width of the engaging holes in the diametrical direction of the retainer, and the engaging holes have tapered surfaces on both sides of an opening thereof through which the engaging claw is inserted, the distance between the tapered surfaces increasing toward the opening, thereby satisfying the relation.

(III) The engaging claws have a width in the diametrical direction of the retainer that is smaller than the width of the engaging holes in the diametrical direction of the retainer, wherein the engaging claws each have a first surface that faces a second surface of one of the engaging holes in a circumferential direction of the retainer, wherein one of the first and second surfaces is formed with an engaging groove extending in an axial direction of the retainer, and the other of the first and second surfaces is formed with an engaging protrusion configured to be fitted in the engaging groove with an interference fit, the engaging grooves having first side surfaces that face each other in the diametrical direction of the retainer, the engaging protrusions having second side surfaces facing in the diametrical direction of the retainer, wherein tapered surfaces are formed at least on the first side surfaces at their portions near the opening of each engaging groove through which the engaging protrusion is inserted into the engaging groove, or on the second side surfaces at their tips.

More preferable arrangements of the synthetic resin retainer are listed below:

1) The two annular members are made of a composite material comprising a matrix of polyamide 46, and 10 to 40% by weight of a fibrous reinforcing material.

2) The two annular members are made of a composite material comprising a matrix of polyamide 66, and 10 to 40% by weight of a fibrous reinforcing material.

3) The two annular members are made of a composite material comprising a matrix of polyphenylene sulfide, and 10 to 40% by weight of a fibrous reinforcing material.

4) The two annular members are made of polyimide.

5) The two annular members are made of polyetheretherketone.

The fibrous reinforcing material may be glass fiber, carbon fiber, aramid fiber, potassium titanate fiber, alumina fiber, silicon carbide fiber, aluminum fiber or boron fiber. Two or more of these fibers may be used too.

From another aspect of the invention, there is provided a ball bearing comprising inner and outer rings, a plurality of balls disposed between the inner and outer rings, the above-described retainer, which is mounted between the inner and outer rings and retaining the balls, the inner and outer rings defining a bearing space therebetween, and bearing seals closing the bearing space, wherein grease is retained in the bearing space.

Since the engaging holes and the engaging claws are configured such that gaps are present between the engaging claws and the engaging holes in the diametrical direction of the retainer in the initial stage of assembly of the retainer, the engaging claws can be easily inserted into the respective engaging holes, so that the retainer can be assembled easily.

Further, since the engaging holes and the engaging claws are configured such that the gaps decrease to zero or less upon completion of the assembly of the retainer, sliding movement between the engaging claws and the engaging holes is prevented by diametrical loads applied to the retainer. This suppresses heat buildup at the engaged portions and thus a rise in temperature of the ball bearing, and also prevents wear, thus preventing shortening of the lifespan of the bearing and noise due to wear powder stuck between moving parts of the bearing.

DETAILED DESCRIPTION OF THE INVENTION

Figure 1:
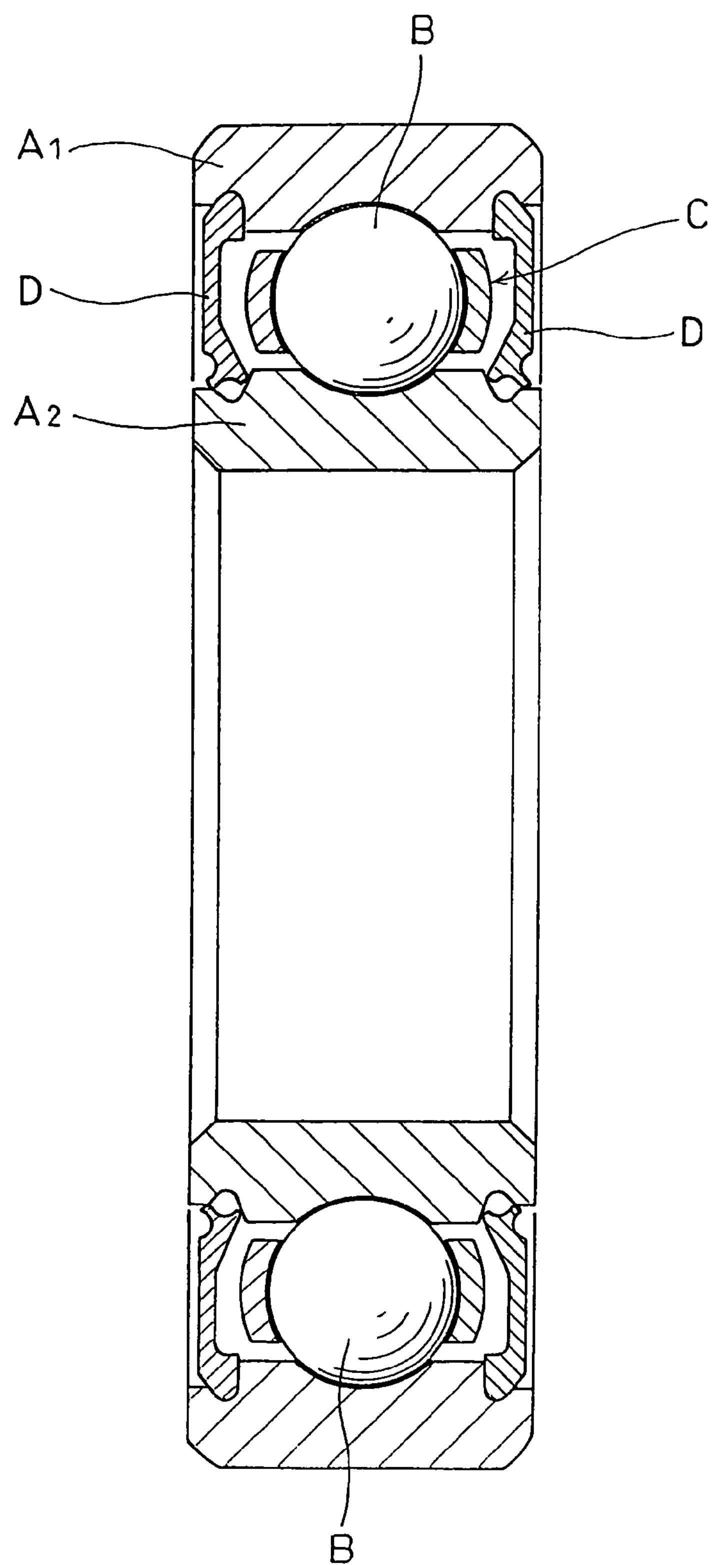
FIG. 1 is a sectional view of a synthetic resin retainer and a ball bearing according to a first embodiment of the present invention.
Figure 2:
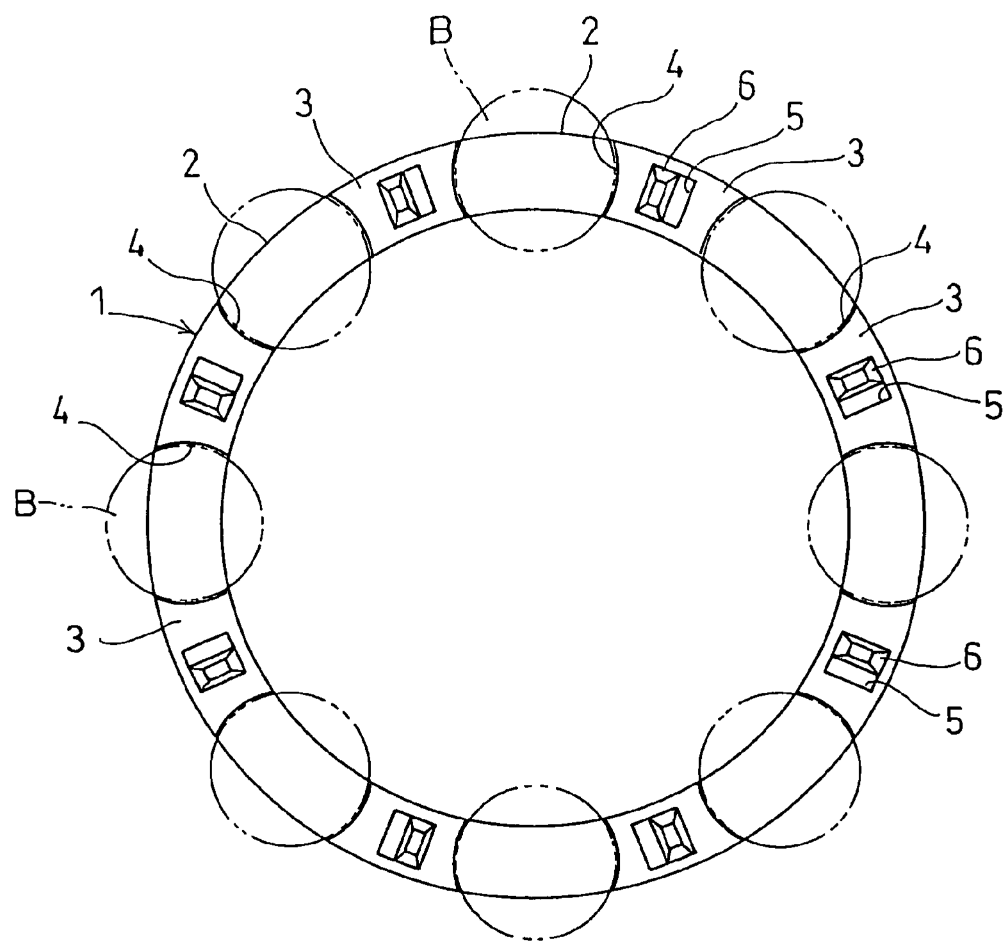
FIG. 2 is a front view of an annular member of the synthetic resin retainer shown in FIG. 1.
Figure 3:
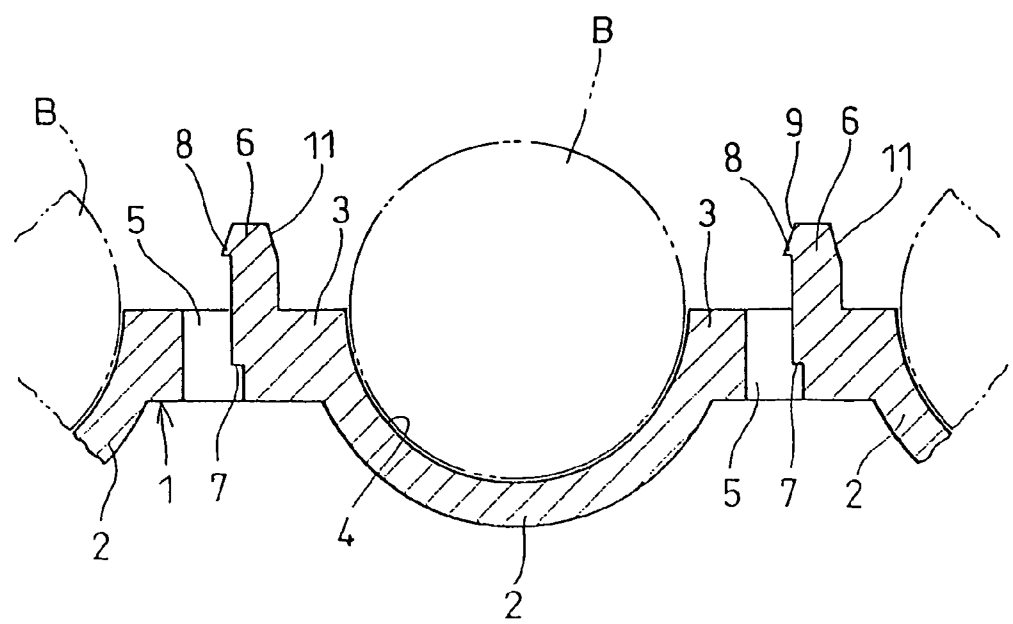
FIG. 3 is a partial enlarged sectional view of FIG. 2.
Figure 4:
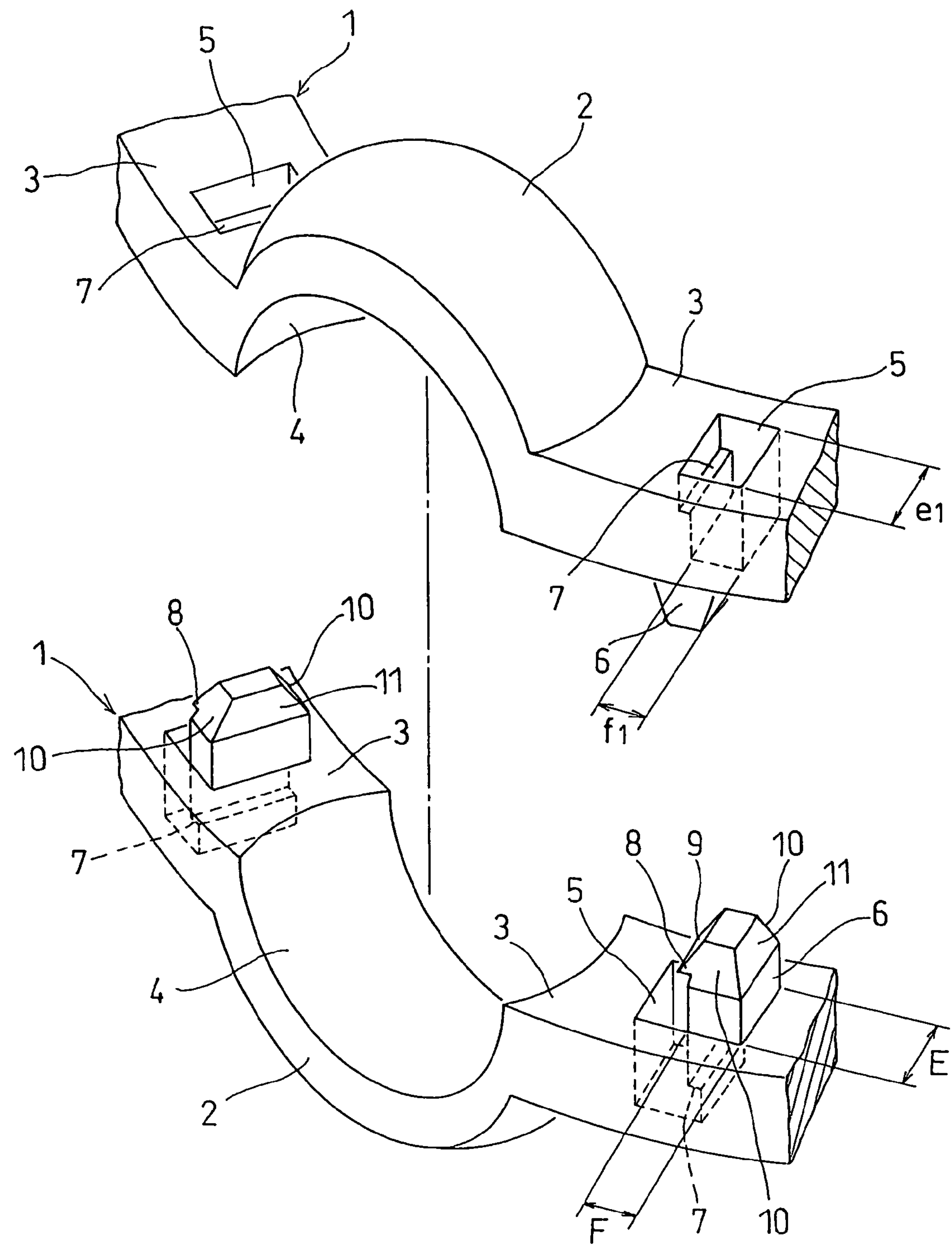
FIG. 4 is a partial exploded perspective view of two annular members.
Figure 5:
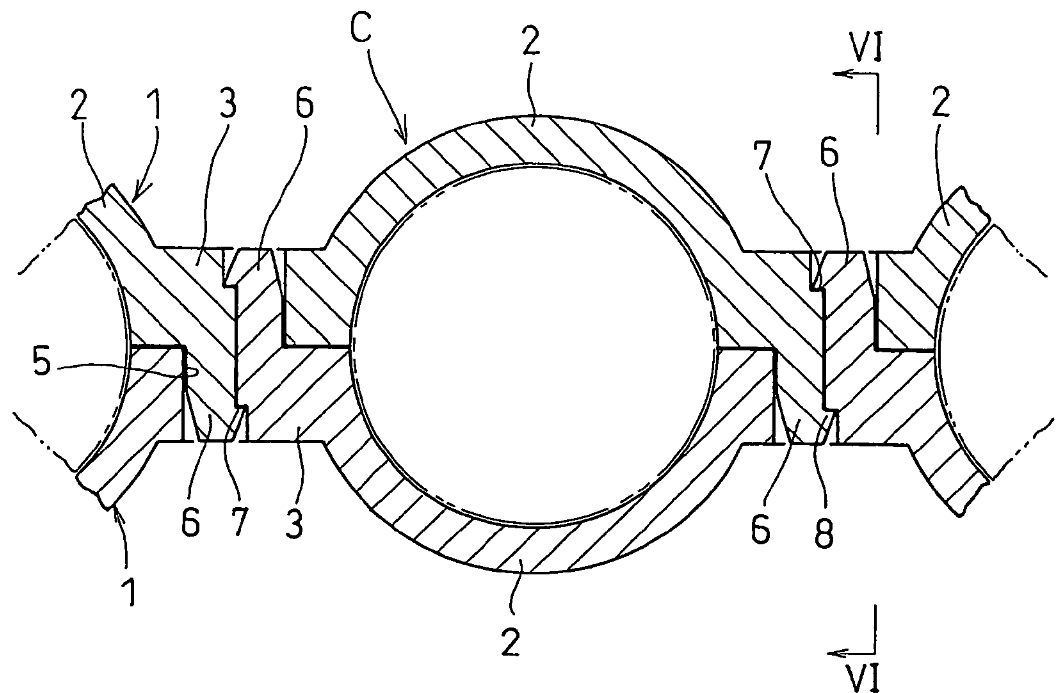
FIG. 5 is a partial sectional view of a retainer formed by joining together the two annular members shown in FIG. 4.

Now referring to the drawings, FIGS. 1 to 6 show a ball bearing according to the first embodiment of the present invention. It comprises an outer ring $A_1$, an inner ring $A_2$, a plurality of balls B disposed between the inner and outer rings $A_1$ and $A_2$, and a retainer C retaining the balls B. As shown in FIGS. 3 to 5, the retainer comprises two annular members 1 which are identical in shape to each other and made of synthetic resin. The outer ring $A_1$ and the inner ring $A_2$ define an annular space therebetween which is sealed by bearing seals D. Grease is retained in the annular space.

As shown in FIGS. 2 to 4, the annular members 1 each comprise a plurality of hemispherical ball retaining portions 2 and a plurality of joint portions 3 each provided between circumferentially adjacent ball retaining portions 2. Each ball retaining portion 2 defines a hemispherical pocket 4 having an opening on one side of the annular member 1. The hemispherical inner wall of each hemispherical pocket 4 extends along the outer periphery of the ball B.

Each joint portion 3 has an engaging hole 5 extending therethrough from one to the other side thereof, and engaging claw 6 configured to be inserted into the corresponding engaging hole 5 of the other annular member 1. Each engaging hole 5 has an engaging shoulder 7 on its inner wall. Each engaging claw 6 has a hook 8 at its free end which is engageable with the engaging shoulder 7. The hook 8 has an inclined end surface 9 which faces in the circumferential direction of the retainer.

The engaging holes 5 and the engaging claws 6 are configured such that in the initial stage of assembly of the retainer, gaps are present in the diametrical direction of the retainer between the engaging holes 5 and the corresponding engaging claws 6, and upon completion of the assembly of the retainer, the engaging claws 6 are engaged in the respective engaging holes 5 with no gaps present therebetween in the diametrical direction of the retainer. For this purpose, the engaging claws 6 have a width E in the diametrical direction of the retainer that is not less than the width $e_1$ of the engaging holes 5 in the diametrical direction of the retainer ($E \geqq e_1$), and also, the engaging claws 6 each have tapered surfaces 10 at its free end on both sides thereof in the diametrical direction of the retainer, thereby reducing the area of the free end surface of the claw 6.

Further, in order that the engaging claws 6 can be easily inserted into the engaging holes 5, the engaging claws 6 each have a width F in the circumferential direction of the retainer that is not more than the width $f_1$ of the engaging holes 5 in the circumferential direction of the retainer ($F \leqq f_1$), and is also formed with a tapered surface 11 on one circumferential surface at the free end portion thereof.

The two annular members 1 are configured such that their respective pockets 4 axially face each other with the plurality of engaging claws 6 of each annular member 1 axially facing the engaging holes 5 formed in the other of the annular member 1. In this state, the two annular members 1 are moved toward each other to allow the engaging claws 6 to be inserted into the respective engaging holes 5. When the two annular members 1 are moved toward each other until their side surfaces abut each other, the hooks 8 of the engaging claws 6 engage the engaging shoulders 7 of the engaging holes, thereby securely joining the two annular members 1 together. The retainer C is thus assembled. As shown in FIG. 5, when assembled, the free ends of the engaging claws are flush with the opposite side surfaces of the respective joint portions 3 and thus do not protrude from the respective engaging holes 5.

To assemble a ball bearing using this retainer C, as many balls B as there are pockets 4 formed in the retainer C are disposed between the outer ring $A_1$ and the inner ring $A_2$. The two annular members 1 are inserted into the annular space defined between the inner and outer rings from one and the side of the inner and outer rings, respectively, until the engaging claws 6 are engaged in the respective engaging holes 5. Grease is then filled into the annular space between the inner and outer rings, and bearing seals are mounted between the inner and outer rings to close both end openings of the annular space.

Figure 6:
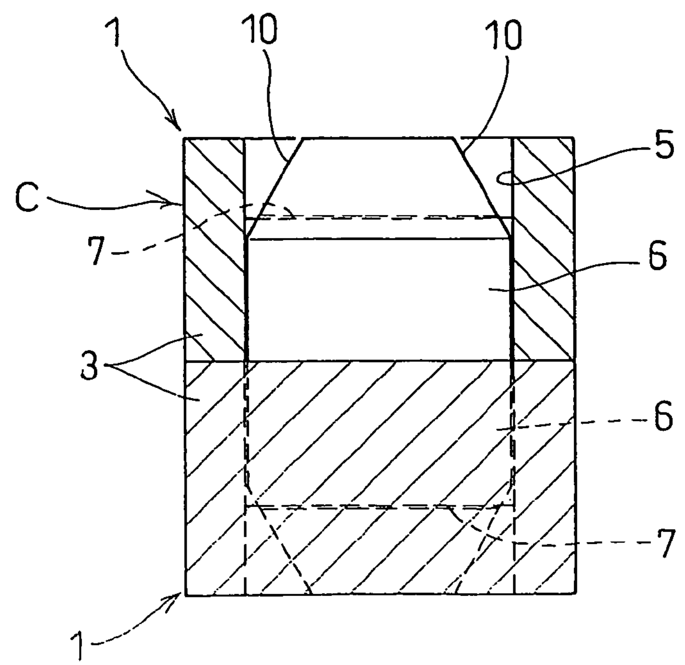
FIG. 6 is a sectional view taken along line VI-VI of FIG. 5.

Because the width E of the engaging claws 6 in the diametrical direction of the retainer is not less than the width $e_1$ of the engaging holes 5 in the diametrical direction of the retainer, with the engaging claws 6 engaged in the engaging holes 5 as shown in FIG. 6, the gaps between the engaging claws 6 and the engaging holes 5 in the diametrical direction of the retainer are not greater than zero.

Thus, even when the balls B rotate alternately faster and slower than the bearing rings during the operation of the bearing, and as a result, axial loads are applied to the retainer C, the hooks 8 of the engaging claws 6 never slide on the engaging shoulders 7 of the engaging holes 5. This suppresses temperature rise in the bearing due to heat buildup at the engaging portions between the hooks 8 and the engaging shoulders 7.

It is also possible to prevent friction between the engaging claws 6 and the engaging holes 5. This in turn prevents shortening of the lifespan of the bearing and noise due to powder produced as a result of friction and getting into between moving parts of the bearing.

Also, because the tapered surfaces 10 are provided at the free end of each engaging claw 6 on both sides thereof in the diametrical direction of the retainer so that the width E of the engaging claws 6 in the diametrical direction of the retainer is smaller at its free end than the width $e_1$ of the engaging holes 5 in the diametrical direction of the retainer, the engaging claws 6 can be easily inserted into the engaging holes 5. This makes it easier to assemble the retainer C.

Figure 7:
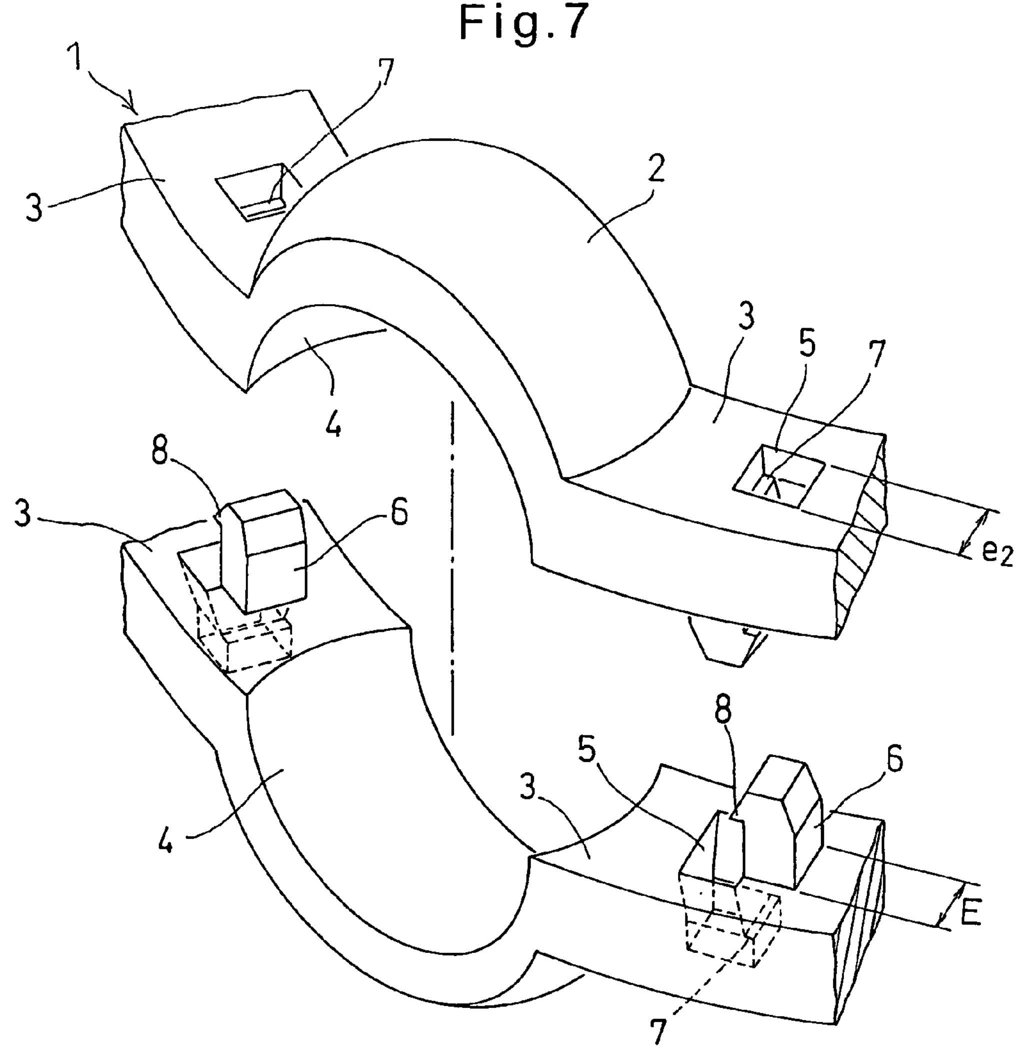
FIG. 7 is a partial exploded perspective view of two annular members forming a synthetic resin retainer according to a second embodiment of the present invention.
Figure 8:
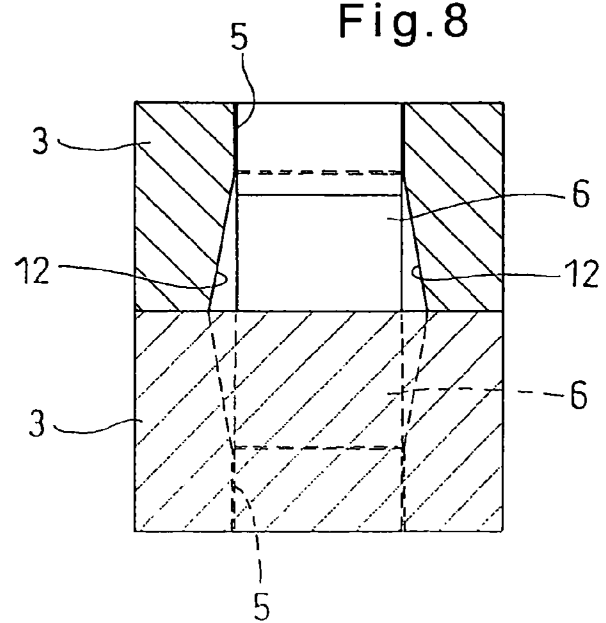
FIG. 8 is a sectional view of the annular members shown in FIG. 7 when joined together.

FIGS. 7 and 8 show the second embodiment of this invention. The retainer of this embodiment is also mounted in a ball bearing similar to the ball bearing shown in FIG. 1 and differs from the retainer C shown in FIGS. 1 to 6 only in the structures of the engaging claws 6 and the engaging holes 5. Thus, elements identical or similar to those of the retainer shown in FIGS. 1 to 6 are denoted by identical numerals and their description is omitted.

In the second embodiment, the engaging claws 6 have a width E in the diametrical direction of the retainer that is not less than the width $e_2$ of the engaging holes 5 in the diametrical direction of the retainer ($E \geqq e_2$). Each engaging hole 5 has an open end through which the engaging claw 6 is inserted into the engaging hole 5, and tapered surfaces 12 on both sides of the open end thereof which are configured such that the distance therebetween increases toward the open end.

In the second embodiment too, in the initial stage of assembly of the retainer C by joining the two annular members 1 together, the tips of the engaging claws 6 can be inserted into the respective engaging holes 5 with sufficient play therebetween, so that the retainer C can be assembled easily.

When the retainer C is fully assembled with the engaging claws 6 fully engaged in the engaging holes 5, the gaps between the engaging claws 6 and the engaging holes 5 in the diametrical direction of the retainer is not greater than zero, so that it is possible to prevent the hooks 8 of the engaging claws 6 from sliding along the respective engaging shoulders 7, thereby preventing wear of the engaging claws 6 at their portions that engage the shoulders 7.

Figure 9:
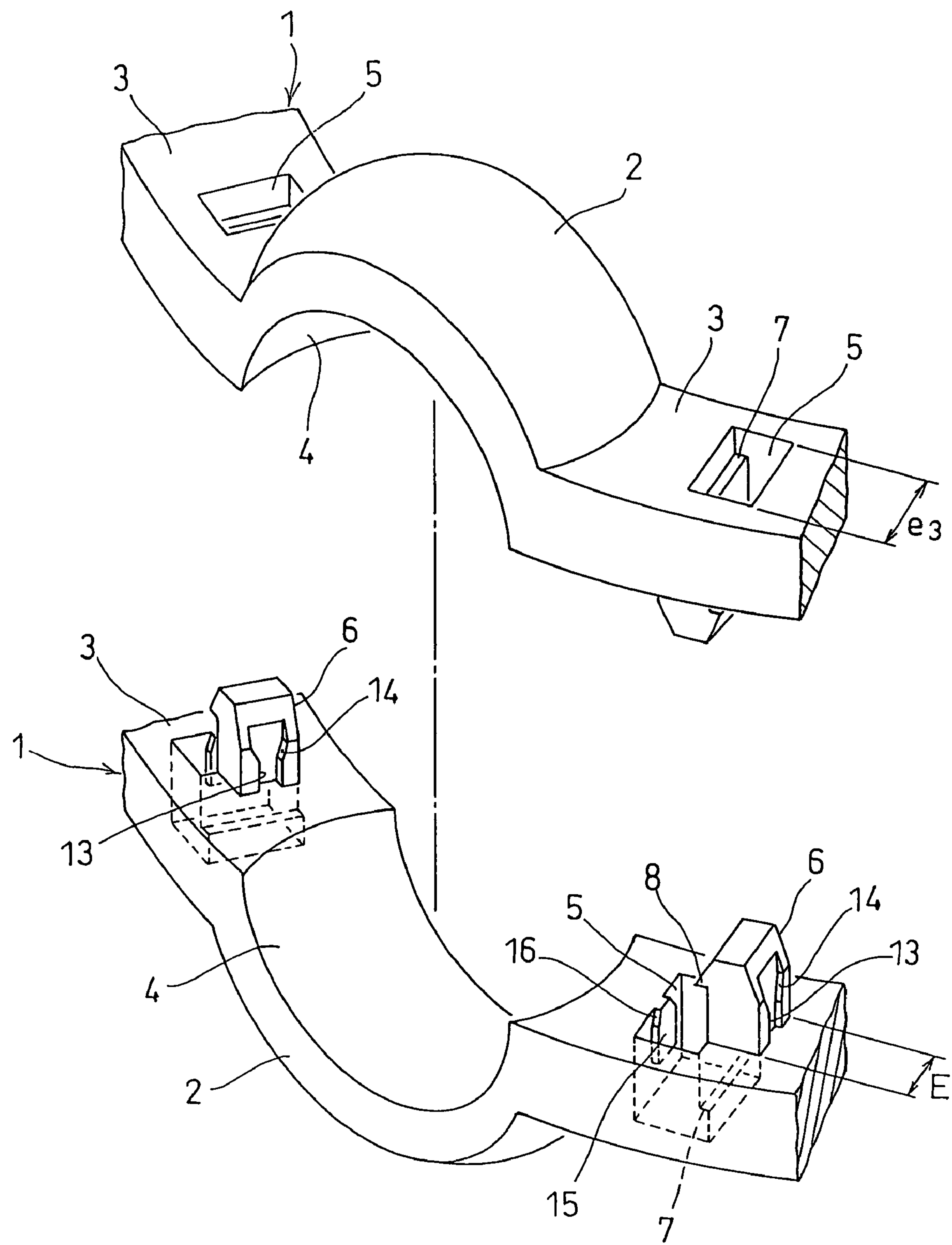
FIG. 9 is a partial exploded perspective view of two annular members forming a synthetic resin retainer according to a third embodiment of the present invention.
Figure 10:
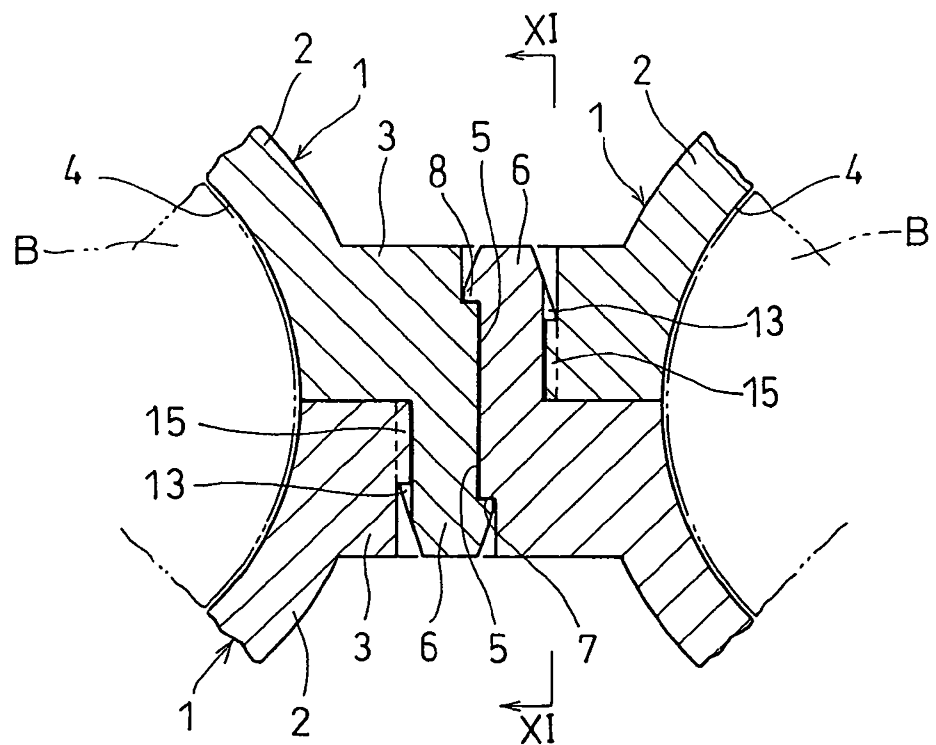
FIG. 10 is a sectional view of the annular members shown in FIG. 9 when joined together.
Figure 11:
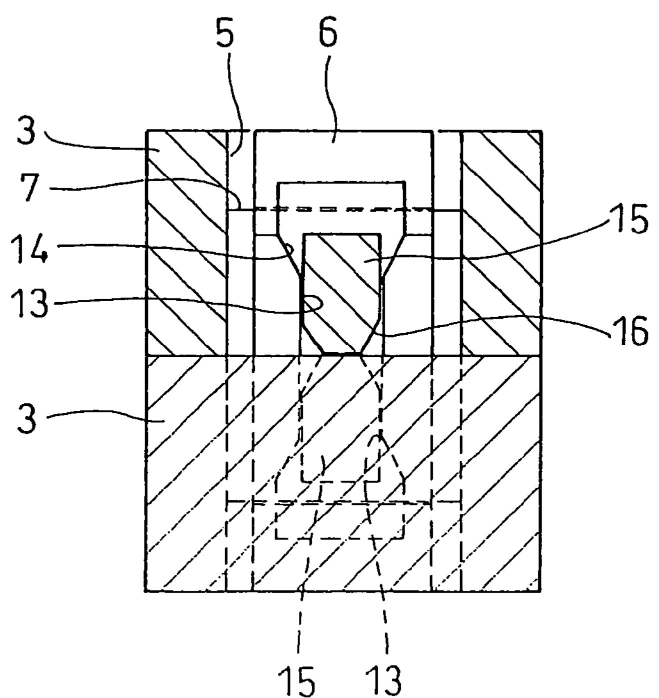
FIG. 11 is a sectional view taken along line XI-XI of FIG. 10.

FIGS. 9 to 11 show the third embodiment of the invention. The retainer of this embodiment is mounted in a ball bearing similar to the ball bearing shown in FIG. 1, and differs from the retainer shown in FIGS. 1 to 6 only in the structures of the engaging claws 6 and the engaging holes 5.

Thus, elements similar or identical to those of the retainer shown in FIGS. 1 to 6 are denoted by identical numerals and their description is omitted.

In the third embodiment, the width E of the engaging claws 6 in the diametrical direction of the retainer is smaller than the width $e_3$ of the engaging holes 5 in the diametrical direction of the retainer ($E<e_3$). An engaging groove 13 is formed in the back of each engaging claw 6, i.e. in its surface opposite to the surface where the hook 8 is formed, to extend in the direction in which the engaging claw 6 is inserted into the engaging hole 5. Tapered surfaces 14 are formed on both sides of the groove 13 at its tip.

Each engaging hole 5 has an engaging protrusion 15 on its inner surface opposite to the engaging shoulder 7 which is configured to be fitted in the engaging groove 13 with an interference fit when the engaging claw 6 is inserted into the engaging hole 5. Tapered surfaces 16 are formed on both sides of the engaging protrusion 15 at its tip.

By forming the engaging groove 13 in each engaging claw 6 and providing the engaging protrusion 15 on the inner surface of each engaging hole 5, when the retainer C is assembled by coupling the two annular members 1 together with the engaging claws 6 inserted in the respective engaging holes 5, the engaging protrusions 15 engage in the engaging grooves 13. Because the engaging protrusions 15 engage in the respective engaging grooves 13 with an interference fit, the hook 8 of each engaging claw 6 is prevented from sliding along the engaging shoulder 7 in the diametrical direction of the retainer. This prevents wear of the engaging claws 6 at their engaging portions.

Because the width E of the engaging claws 6 is smaller than the width $e_3$ of the engaging holes 5, the engaging claws 6 can be easily inserted into the engaging holes 5, so that the retainer C can be easily assembled.

Figure 12:
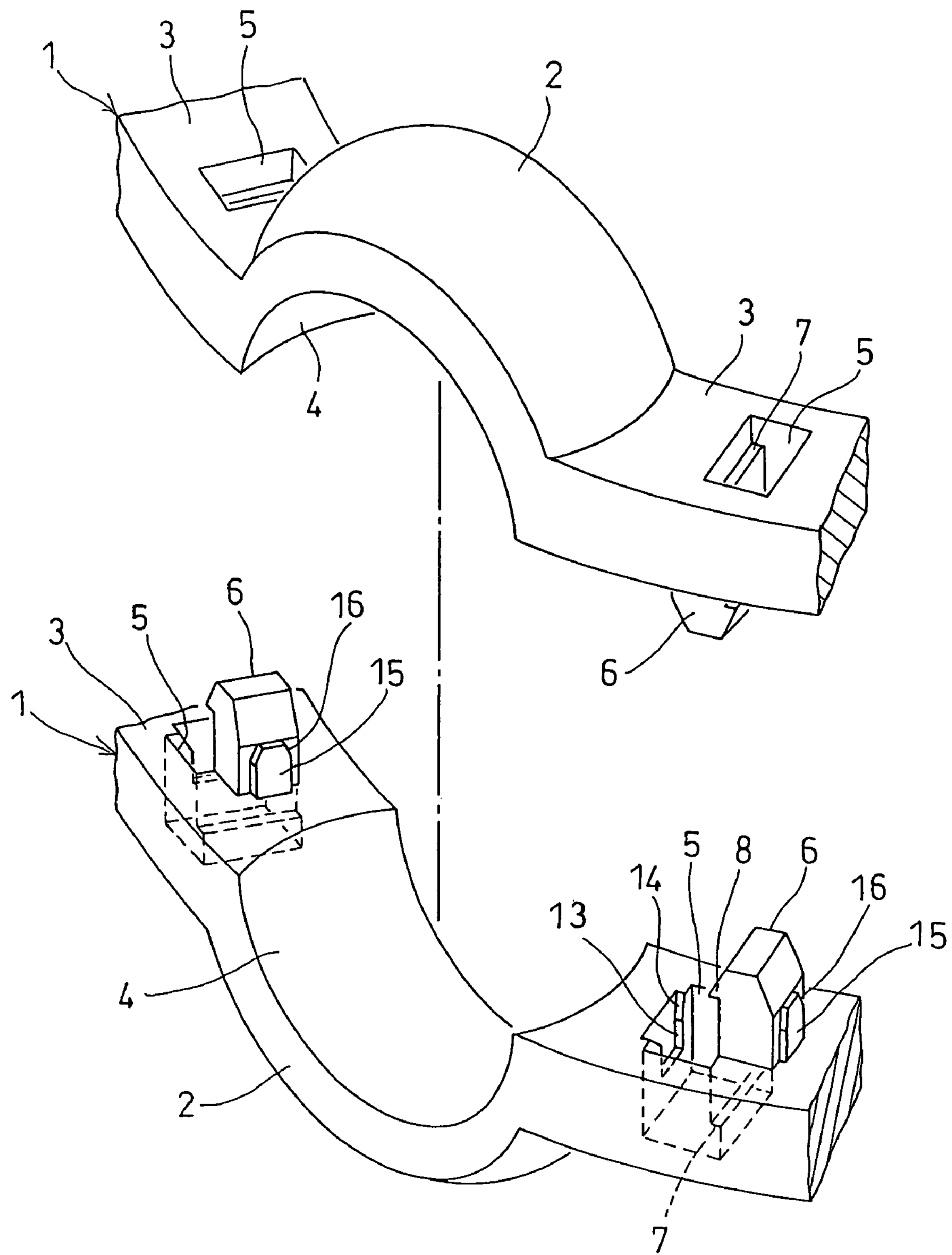
FIG. 12 is a partial exploded perspective view of two annular members forming a synthetic resin retainer according to a fourth embodiment of the present invention.
Figure 13:
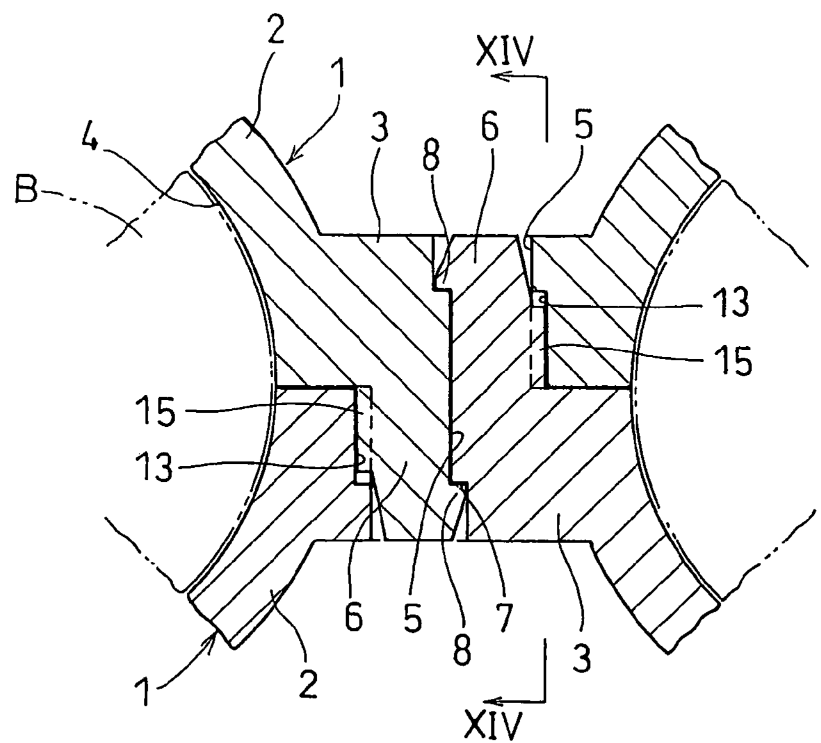
FIG. 13 is a sectional view of the annular members shown in FIG. 12 when joined together.
Figure 14:
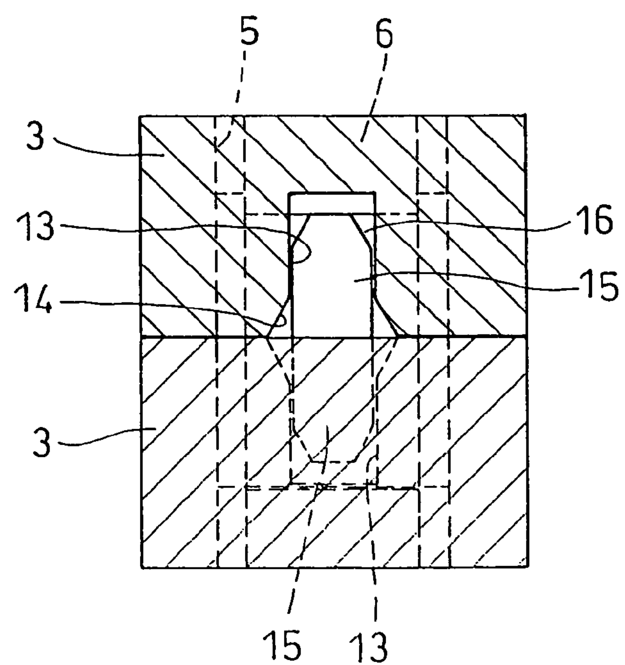
FIG. 14 is a sectional view taken along line XIV-XIV of FIG. 13.

FIGS. 12 to 14 show the fourth embodiment of the invention. The retainer of this embodiment is mounted in a ball bearing similar to the ball bearing shown in FIG. 1, and differs from the retainer shown in FIGS. 9 to 11 only in that the engaging claws 6 each have an engaging protrusion 15 on one side thereof and the engaging holes 5 each have an engaging groove 13 in its inner wall. Thus, elements similar or identical to those of the retainer shown in FIGS. 9 to 11 are denoted by identical numerals, and their description is omitted.

The retainer of the fourth embodiment provides substantially the same advantages as the retainer of the third embodiment.

In the third and fourth embodiments, the tapered surfaces 14 and 16 are formed at the opening of each engaging groove 13 and at the tip of each engaging protrusion 15, respectively. But either the tapered surfaces 14 or the tapered surfaces 16 may be omitted.

The two annular members 1 forming the retainer of any of the first to fourth embodiments is preferably made of a composite material comprising polyamide 46 (hereinafter referred to as "PA46") or polyamide 66 (hereinafter referred to as "PA66") as a matrix, and 10-40% by weight of a fibrous reinforcing material. By adding a reinforcing material by not less than 10% by weight, the retainer C maintains sufficient strength during high-temperature, high-speed operation. By limiting the content of the reinforcing material to not less than 40% by weight, the melt viscosity is low, so that formability is high. Also, sufficient strength is maintained at welded portions.

The fibrous reinforcing material may be glass fiber, carbon fiber, aramid fiber, potassium titanate fiber, alumina fiber, silicon carbide fiber, aluminum fiber or boron fiber, and is preferably glass fiber, carbon fiber or aramid fiber. Two or more of these fibers may be used too.

Preferably, such a fibrous reinforcing material has an average fiber diameter of 1 to 20 μm and an average fiber length of 0.1 to 5 mm.

Such fiber is preferably subjected to surface treatment with a silane, titanium or aluminum coupling agent to improve affinity for polycyanoaryl ether. With this arrangement, the fibers are more strongly bound to the polycyanoaryl ether, so that the strength of the retainer C improves.

If glass fiber is used as a reinforcing material, it is preferably added by 20 to 30% by weight. If carbon fiber is used, it is preferably added by 20 to 35% by weight.

Also, if glass fiber is used, it preferably has an aspect ratio (ratio of the average fiber length to the average fiber diameter) of not less than 10.

A retainer containing PA46 as the matrix would be superior in heat resistance and durability to a retainer containing PA66 as the matrix. If PA46 is used as the matrix, an elastomer having rubber-like elasticity is preferably added so that the retainer can be easily mounted in a bearing. Such an elastomer is preferably ethylene-propylene rubber, and its content is preferably 2 to 10% by weight, more preferably 2 to 6% by weight. By adding ethylene-propylene rubber by not less than 2% by weight, the retainer C can be easily mounted in a bearing. By limiting the content of ethylene-propylene rubber to not more than 10% by weight, more preferably to not more than 6% by weight, the addition of ethylene-propylene rubber will scarcely deteriorate the heat resistance and formability.

The annular members 1 may be formed as follows.

Pelletized PA46 or PA66 and a fibrous reinforcing material are dry-blended in a mixer and melt-kneaded in e.g. a twin-screw extruder at 350 to 400° C., preferably 360 to 380° C. to obtain pellets. The pellets are then injection-molded into the annular members 1, with the resin temperature at 350 to 390° C. and the mold temperature at 150 to 230° C.

Alternatively, the annular members 1 may be formed by dry-blending pelletized PA46 or PA66 and a fibrous reinforcing material in a mixer, forming the mixture into columnar or cylindrical members with e.g. a ram extruder, and cutting the columnar or cylindrical members.

To the composite material to be formed into the annular members 1, heat stabilizers, solid lubricants, lubricating oil, colorants, antistatic agents, release agents, flowability improvers and/or crystallization promoters may be added.

Alternatively, the two annular members 1 forming the retainer of any of the first to fourth embodiments may be made of a composite material comprising polyphenylene sulfide (hereinafter referred to as "PPS") as a matrix, and 10 to 40% by weight of a fibrous reinforcing material. A retainer using PPS as its matrix is superior in heat resistance, oil resistance and chemical resistance to a retainer using PA as its matrix. Straight-chain PPS is especially preferable because a retainer using such PPS is higher in toughness than a retainer using crosslinked PPS. By adding the reinforcing material by not less than 10% by weight, it is possible to reduce the amount of PPS and thus the cost of the retainer. By limiting its content to not more than 40% by weight, it is possible to prevent breakage of the engaging claws when the retainer is assembled because the retainer is sufficiently deformable.

If carbon fiber is used as the reinforcing material, its content is preferably 20 to 35% by weight.

If glass fiber is used as the reinforcing material, it preferably has an average fiber diameter of 5 to 20 μm and an average fiber length of 0.2 to 1 mm.

To the composite material to be formed into the annular members 1, 10 to 25% by weight of an inorganic filler may be added to reduce the content of PPS and thus the cost of the retainer. By adding such a filler by not less than 10% by weight, it reliably serves its purposes as a filler. By limiting its content to not more than 25% by weight, formability of the retainer is good. Such an inorganic filler may be calcium carbonate powder having a particle diameter of not more than 10 μm or its grains.

To the composite material to be formed into the annular members 1, organic reinforcing agents, lubricants, plasticizers, flame-retardants, etc. may be added.

Further alternatively, the two annular members 1 forming the retainer of any of the first to fourth embodiments may be made of a composite material comprising polyimide (hereinafter referred to as "PI") or polyetheretherketone (hereinafter referred to as "PEEK") as a matrix, and 10 to 40% by weight of a fibrous reinforcing material. A retainer using PI or PEEK as its matrix is superior in heat resistance to a retainer using PA as its matrix, so that such a retainer can be used in a high-temperature environment exceeding 150° C. By adding the reinforcing material by not less than 10% by weight, it is possible to reduce the amount of PI or PEEK and thus the cost of the retainer. By limiting its content to not more than 40% by weight, it is possible to prevent breakage of the engaging claws 6 when the retainer is assembled because the retainer is sufficiently deformable.

If glass fiber is used as the reinforcing material, its content is preferably 20 to 40% by weight, more preferably 20 to 35% by weight. If carbon fiber is used, its content is preferably 20 to 30% by weight.

What is claimed is:

1. A synthetic resin retainer comprising two annular members made of a synthetic resin, each of said annular members having a plurality of hemispherical pockets formed in a side surface thereof to be brought into abutment with the side surface of the other annular member, said hemispherical pockets being arranged at equal intervals in a circumferential direction of each of said annular members, each of said annular members further including joint portions each disposed between adjacent ones of said hemispherical pockets, each of said joint portions having an engaging hole having an engaging shoulder formed on an inner periphery thereof, and an engaging claw having a hook at a free end thereof, said engaging claws of each of said annular members being configured to be engaged in the respective engaging holes formed in the other of said annular members and to have said hook of each of said engaging claws engage the engaging shoulder of the corresponding engaging hole, thereby joining said annular members together, wherein said engaging claws and said engaging holes are configured so as to satisfy a relation such that a gap is present between each engaging claw and the engaging hole into which said each engaging claw is inserted in a diametrical direction of the retainer in the initial stage of assembly of the retainer, and said gap decreases to zero or less upon completion of assembly of the retainer, and such that, with said hooks in engagement with the respective engaging shoulders, the free ends of said engaging claws do not protrude from the respective engaging holes upon the completion of assembly of the retainer.

2. The synthetic resin retainer of claim 1 wherein said engaging claws have a width in the diametrical direction of the retainer that is not less than the width of said engaging holes in the diametrical direction of the retainer, and have tapered surfaces on both sides thereof in the diametrical direction of the retainer which reduce the area of a free end surface of each engaging claw, thereby satisfying said relation.

3. A ball bearing comprising inner and outer rings, a plurality of balls disposed between said inner and outer rings, the retainer of claim 2, said retainer being mounted between said inner and outer rings and retaining said balls, said inner and outer rings defining a bearing space therebetween, and bearing seals closing said bearing space, wherein grease is retained in said bearing space.

4. The synthetic resin retainer of claim 1 wherein said engaging claws have a width in the diametrical direction of the retainer that is not less than the width of said engaging holes in the diametrical direction of the retainer, and said engaging holes have tapered surfaces on both sides of an opening thereof through which the engaging claw is inserted, the distance between said tapered surfaces increasing toward said opening, thereby satisfying said relation.

5. A ball bearing comprising inner and outer rings, a plurality of balls disposed between said inner and outer rings, the retainer of claim 4, said retainer being mounted between said inner and outer rings and retaining said balls, said inner and outer rings defining a bearing space therebetween, and bearing seals closing said bearing space, wherein grease is retained in said bearing space.

6. The synthetic resin retainer of claim 1 wherein said two annular members are made of a composite material comprising a matrix of polyamide 46, and 10 to 40% by weight of a fibrous reinforcing material.

7. A ball bearing comprising inner and outer rings, a plurality of balls disposed between said inner and outer rings, the retainer of claim 6, said retainer being mounted between said inner and outer rings and retaining said balls, said inner and outer rings defining a bearing space therebetween, and bearing seals closing said bearing space, wherein grease is retained in said bearing space.

8. The synthetic resin retainer of claim 1 wherein said two annular members are made of a composite material comprising a matrix of polyamide 66, and 10 to 40% by weight of a fibrous reinforcing material.

9. A ball bearing comprising inner and outer rings, a plurality of balls disposed between said inner and outer rings, the retainer of claim 8, said retainer being mounted between said inner and outer rings and retaining said balls, said inner and outer rings defining a bearing space therebetween, and bearing seals closing said bearing space, wherein grease is retained in said bearing space.

10. The synthetic resin retainer of claim 1 wherein said two annular members are made of a composite material comprising a matrix of polyphenylene sulfide, and 10 to 40% by weight of a fibrous reinforcing material.

11. A ball bearing comprising inner and outer rings, a plurality of balls disposed between said inner and outer rings, the retainer of claim 10, said retainer being mounted between said inner and outer rings and retaining said balls, said inner and outer rings defining a bearing space therebetween, and bearing seals closing said bearing space, wherein grease is retained in said bearing space.

12. The synthetic resin retainer of claim 1 wherein said two annular members are made of polyimide.

13. A ball bearing comprising inner and outer rings, a plurality of balls disposed between said inner and outer rings, the retainer of claim 12, said retainer being mounted between said inner and outer rings and retaining said balls, said inner and outer rings defining a bearing space therebetween, and bearing seals closing said bearing space, wherein grease is retained in said bearing space.

14. The synthetic resin retainer of claim 1 wherein said two annular members are made of polyetheretherketone.

15. A ball bearing comprising inner and outer rings, a plurality of balls disposed between said inner and outer rings, the retainer of claim 14, said retainer being mounted between said inner and outer rings and retaining said balls, said inner and outer rings defining a bearing space therebetween, and bearing seals closing said bearing space, wherein grease is retained in said bearing space.

16. A ball bearing comprising inner and outer rings, a plurality of balls disposed between said inner and outer rings, the retainer of claim 1, said retainer being mounted between said inner and outer rings and retaining said balls, said inner and outer rings defining a bearing space therebetween, and bearing seals closing said bearing space, wherein grease is retained in said bearing space.

17. The synthetic resin retainer of claim 1, wherein side surfaces of said annular members opposite the side surfaces to be brought into abutment with each other are planar in said joint portions.

18. The synthetic resin retainer of claim 17, wherein the annular members are configured such that upon the completion of assembly of the retainer, the free ends of the engaging claws are, respectively flush with the side surfaces of the annular members opposite the side surfaces that are in abutment with each other.

19. A synthetic resin retainer comprising two annular members made of a synthetic resin, each of said annular members having a plurality of hemispherical pockets formed in a side surface thereof to be brought into abutment with the side surface of the other annular member, said hemispherical pockets being arranged at equal intervals in a circumferential direction of the annular member, each of said annular members further including joint portions each disposed between adjacent ones of said hemispherical pockets, each of said joint portions having an engaging hole and an engaging claw, said engaging claws of each of said annular members being configured to be engaged in the respective engaging holes formed in the other of said annular members, thereby joining said annular members together, wherein said engaging claws and said engaging holes are configured so as to satisfy a relation such that a gap is present between each engaging claw and the engaging hole into which said each engaging claw is inserted in a diametrical direction of the retainer in the initial stage of assembly of the retainer, and said gap decreases to zero or less upon completion of assembly of the retainer, wherein said engaging claws have a width in the diametrical direction of the retainer that is smaller than the width of said engaging holes in the diametrical direction of the retainer, wherein said engaging claws each have a first surface that faces a second surface of one of said engaging holes in a circumferential direction of the retainer, wherein one of said first and second surfaces is formed with an engaging groove extending in an axial direction of the retainer, and the other of said first and second surfaces is formed with an engaging protrusion configured to be fitted in said engaging groove with an interference fit, said engaging grooves having first side surfaces that face each other in the diametrical direction of the retainer, said engaging protrusions having second side surfaces facing in the diametrical direction of the retainer, wherein tapered surfaces are formed at least on said first side surfaces at their portions near the opening of each engaging groove through which the engaging protrusion is inserted into the engaging groove, or on said second side surfaces at their tips, thereby satisfying said relation.

20. A ball bearing comprising inner and outer rings, a plurality of balls disposed between said inner and outer rings, the retainer of claim 19, said retainer being mounted between said inner and outer rings and retaining said balls, said inner and outer rings defining a bearing space therebetween, and bearing seals closing said bearing space, wherein grease is retained in said bearing space.

* * * * *